Oct. 25, 1949.  W. G. VAN VOORHIS  2,485,792
GEAR AND RACK TYPE CONTROL
Filed Jan. 14, 1947  2 Sheets-Sheet 1
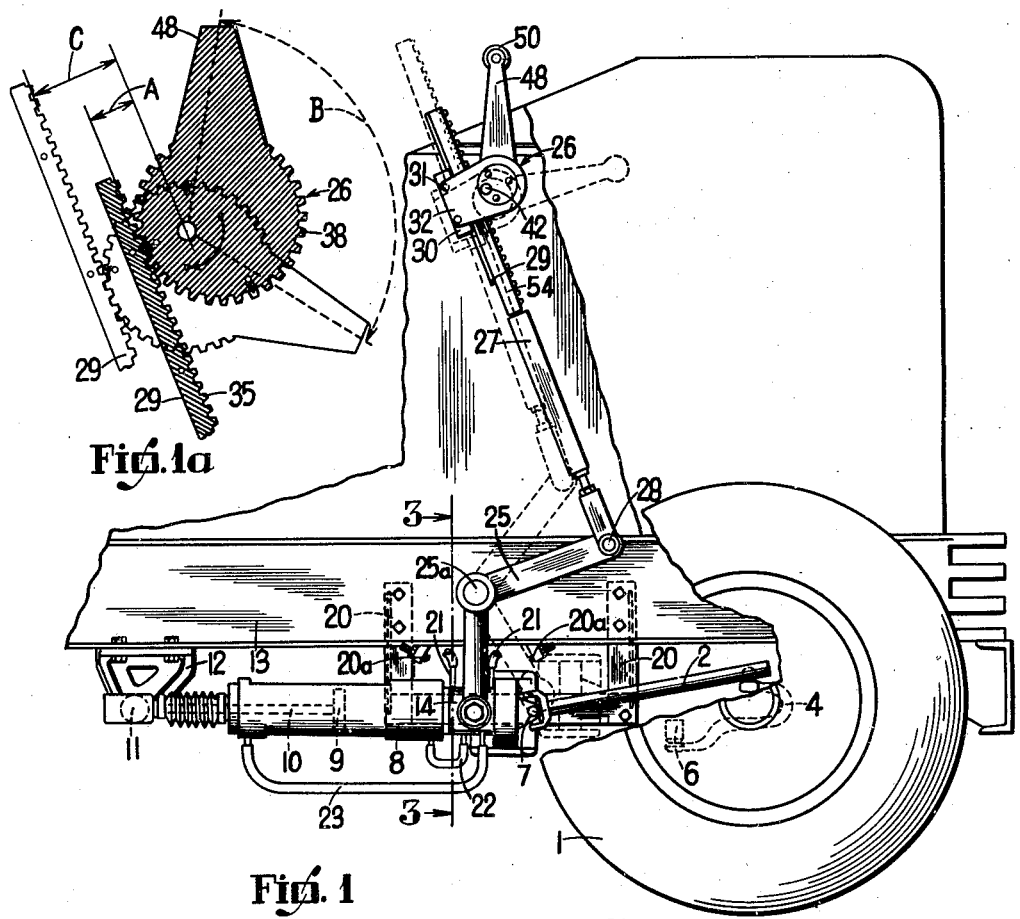
Fig. 1a
Fig. 1
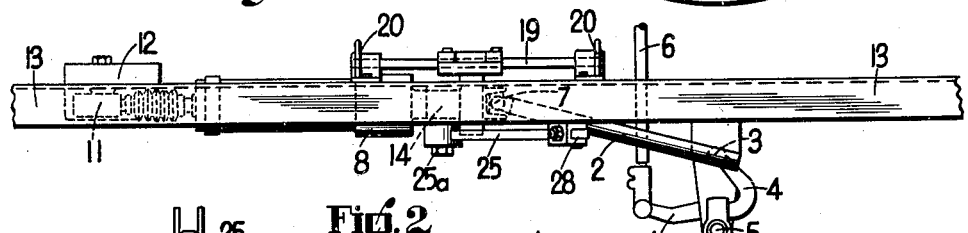
Fig. 2
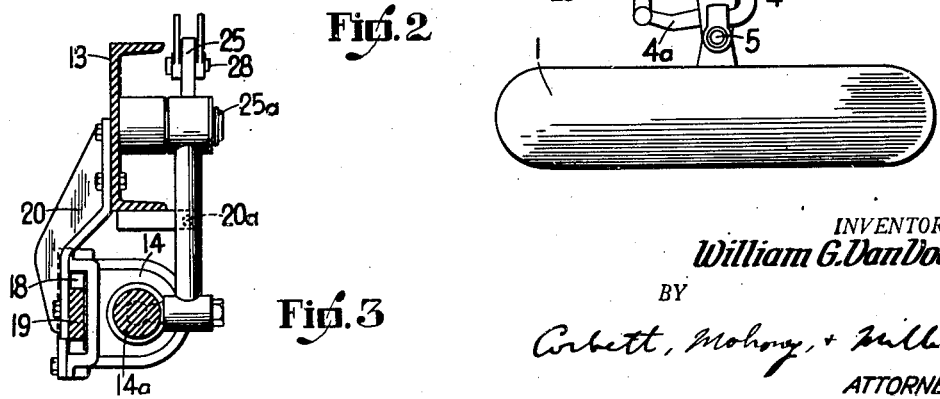
Fig. 3
INVENTOR.
William G. Van Voorhis
BY
Corbett, Mahony, + Miller
ATTORNEYS Oct. 25, 1949.  W. G. VAN VOORHIS  2,485,792
GEAR AND RACK TYPE CONTROL
Filed Jan. 14, 1947  2 Sheets-Sheet 2

INVENTOR.
William G. Van Voorhis
BY
Corbett, Mahoney & Miller
ATTORNEYS

Patented Oct. 25, 1949

2,485,792

UNITED STATES PATENT OFFICE 2,485,792

GEAR AND RACK TYPE CONTROL

William G. Van Voorhis, Columbus, Ohio, assignor to The Jaeger Machine Company, Columbus, Ohio, a corporation of Ohio Application January 14, 1947, Serial No. 721,992

9 Claims. (Cl. 74—422)

My invention relates to a gear and rack type control. It has to do, more particularly, with novel gear and rack mechanism which may be used as a hand-operated control for obtaining the desired movement of a selected member. Although in the following description, I indicate that my novel gear and rack mechanism is used for controlling a hydraulic steering system, it is to be understood that this is for illustrative purposes only and that my mechanism can be employed for other purposes. For example, my gear and rack mechanism may be incorporated in a control which is strictly mechanical.

The conventional type of mechanical steering gear, embodying a steering wheel and worm and sector mechanism, is impractical for certain types of machines, such as yard cranes, road-paving machines, et cetera, because of the considerable amount of lateral space occupied by the steering wheel and associated mechanism. This is a decided disadvantage in such machines where the space is needed for other important control levers, instruments, et cetera. In this type of steering mechanism, that is, one which is strictly mechanical, it is desirable to have the overall ratio of the steering control greater towards the termination of the rotation of the steering wheel than in the initial stages of rotation of such wheel to produce swinging of the turning wheels. This is because the force required to angle the turning wheels to right or left increases gradually as the steering wheel is turned in either direction from neutral to the right or left. With this conventional type of mechanical steering gear also, the steering wheel must make several revolutions in order to accomplish a full right or a full left turning wheel cramp. Since the turning wheels are usually covered by wide fenders, in machines of the type indicated, the operator has no clue as to the position of the turning wheels when the machine is not moving. Thus, this is very inconvenient for the operator since he will be required to make a trial start backward or forward to find out which way such wheels are turned each time he starts to move the machine. This is particularly true in the case of crane loaders where the machine, in many instances, must operate in very cramped quarters.

To overcome certain disadvantages of mechanical steering gear, hydraulic steering systems have been used on various machines such as yard cranes, road paving machines, et cetera. The hydraulic steering system is actuated usually by a booster cylinder having a control valve associated therewith. A hand-operated control is generally connected by some mechanical structure to the control valve associated with the booster cylinder. In steering the machine along a straight course, it is necessary to make slight adjustments of the control valve in both directions away from neutral or central position frequently while, on the other hand, in making a full turn of the machine to the right or left, it is necessary to make a substantial adjustment of the control valve in either direction as quickly as possible. Thus, it is very desirable for the operator to be provided with a hand-operated control unit which is of such a nature that the hand control can be moved through a considerable distance in either direction away from neutral or central position without producing very much movement of the control valve. However, the control unit must also be of such a nature that as the hand control is moved further away from neutral position, the relative movement of the control valve will increase greatly. Consequently, if this type of control unit is associated with a hydraulic steering system, a very great mechanical advantage, that is high ratio of movement of the hand control relative to turning wheel movement, is obtained in the center portion of the cycle, which is the portion that is used most when the machine is traveling at high speed along a straight course. On the other hand, in the end portions of the cycle, the mechanical advantage, that is, ratio of movement of the hand control relative to turning wheel movement, decreases. The average ratio should be such that full movement of the turning wheels is accomplished by the complete movement of the hand control, such movement usually being limited by adjacent parts on the machine which must be cleared. In prior art hydraulic steering systems having a mechanically actuated booster valve, when the hydraulic part of the steering system is inoperative, because of a leaking line, broken pump, faulty valve, or other failure, the entire system becomes completely useless for steering the machine. It will be apparent that in such emergencies it would be very desirable to have at least some limited control over the steering mechanism to permit steering of the machine to a repair shop. Most of the mechanical controls which have been provided for moving the control valve in the past have been of a complicated and expensive structure.

One of the objects of my invention is to provide a mechanical control unit of the gear and rack type which preferably is actuated by a hand lever, such unit being so designed that initial movement of the hand lever away from neutral or central position will produce slight longitudinal movement of the rack in comparison with the movement of the lever but continued movement of the hand lever will produce longitudinal movement of the rack to an increased extent relative to the movement of the hand lever.

Another object of my invention is to provide a mechanical control unit of the gear and rack type indicated above which can be associated with a hydraulic steering system in such a manner that a very great mechanical advantage, that is high ratio of movement of the hand control lever relative to turning wheel movement, is obtained in the initial swinging of the hand lever in either direction away from neutral or central position and a very low mechanical advantage, that is a low ratio of movement of the hand lever relative to the turning wheel movement, is obtained as the hand lever is swung to either of its extreme positions away from neutral or central position, the mechanical advantage gradually decreasing as the handle swings from such position to its extreme left or extreme right position. Thus, considerable movement of the hand lever away from neutral or central position will be permitted without imparting much movement to the turning wheels, but as the lever is swung farther away from such position, the movement of the turning wheels increases relative to the movement of the lever. Thus, one complete swing of the hand lever produces a complete movement of the turning wheels from full cramp to full cramp.

Another object of my invention is to provide a mechanical control of the gear and rack type described above which is especially suitable for controlling the control valve of a booster cylinder incorporated in a hydraulic steering system, such gear and rack control being so designed and so connected to the valve that movement of the hand lever thereof in either direction away from neutral or central position will first produce only limited movement of the control valve but will result in a gradually increasing movement, in proportion to the movement of the handle, of such control valve.

Another object of my invention is to provide a mechanical control of the gear and rack type indicated above which is so incorporated in a hydraulic steering control system that even though the hydraulic part of the steering system becomes inoperative, limited control of the steering can be accomplished with the mechanical control.

Another object of my invention is to provide a steering control which will, by means of the hand lever position, indicate to the operator the position of the turning wheels.

Another object of my invention is to provide a mechanical control of the type indicated which will occupy a minimum amount of space.

Another object of my invention is to provide a control of such design that all of its parts will lie substantially in a vertical plane rather than in a horizontal plane or in both horizontal and vertical planes as is the case with the conventional steering wheel controls.

Still another object of my invention is to provide a mechanical control of the type indicated which is of a very simple and inexpensive structure being composed of a minimum number of parts.

Various other objects will be apparent hereinafter.

In its preferred form the mechanical control of my invention embodies a longitudinally movable rack bar and a pinion, adapted to be rotated, for imparting the longitudinal movement thereto. The pinion is eccentrically pivoted and is rotated about such pivot by means of a hand lever fastened thereto. Means is provided for keeping said pinion in proper meshing relationship with the rack during the movement thereof around said eccentric pivot. The pinion is so arranged relative to the rack that when the lever is in neutral or central position, the eccentric pivot is at its closest approach to the rack bar and as the lever is swung in either direction away from such position, the eccentric pivot gradually moves away from the rack bar. The result is that in the central or neutral position the moment arm extending from the eccentric pivot to the point of engagement of the pinion teeth with the rack bar teeth is very short and, consequently, there is a high ratio between such moment arm and the moment arm of the control lever which extends from the eccentric pivot to the outer end of the control lever. However, as the control lever is swung away from neutral or central position, the pinion moment arm increases relative to the lever moment arm and, therefore, at the extent of movement of the control lever the ratio is comparatively low. The result of this arrangement is that in the initial movement of the control lever away from neutral or central position and in the resulting initial rotation of the pinion, limited longitudinal movement of the rack bar occurs. However, continued rotation of the pinion results in increased movement of the rack bar compared to the rotative movement of the pinion until near the extent of movement of the control lever, maximum longitudinal movement of the rack bar is obtained by the continued rotation of the pinion.

The above described arrangement and design of the mechanical control makes it particularly suitable for controlling the valve of the booster cylinder of a hydraulic steering system. The rack bar is connected mechanically to the control valve so as to obtain the desired movement of the valve. Thus, in the initial movement of the hand control lever away from neutral or central position, only a slight movement of the valve will result. However, in the continued movement of the hand control lever, greater movement of the control valve relative to that of the lever will result until near the end of the movement of the control lever maximum relative movement of the valve will be produced. Thus, my control will work effectively for steering such machines as yard cranes, road-paving machines, et cetera, where the control valve must be moved slightly to the right and left frequently to keep the machine on a straight course as it travels along at high speed. Moreover, with this type of machine, to make a full right or full left turn, the control valve must be moved quickly to its fullest extent to the right or to the left and my control provides for this requirement.

The foregoing and other objects and advantages of the present invention will appear from the following description and appended claims when considered in connection with the accompanying drawings forming a part of the specification wherein like reference characters designate corresponding parts in the several views and wherein:

Figure 1 is a side elevational view indicating a hydraulic steering system on a machine such system having my gear and rack control associated therewith.

Figure 1a is a diagrammatic view illustrating the principle of my gear and rack control.

Figure 2 is a plan view of the steering control system of Figure 1.

Figure 3 is a transverse sectional view taken substantially along line 3—3 of Figure 1.

Figure 4:
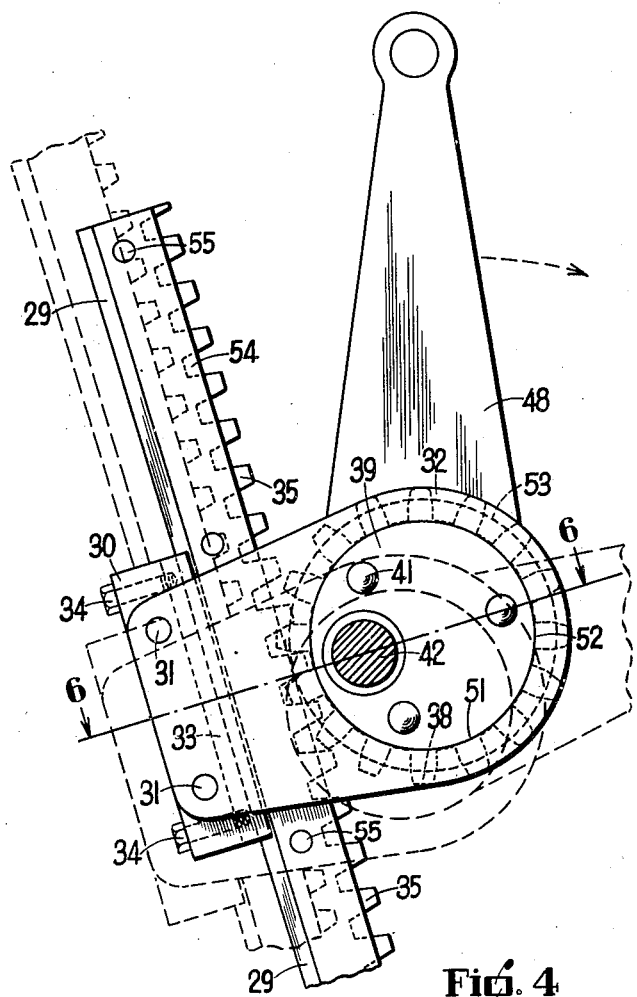
Figure 4 is a side elevational view of the gear and rack mechanism and associated parts.
Figure 5:
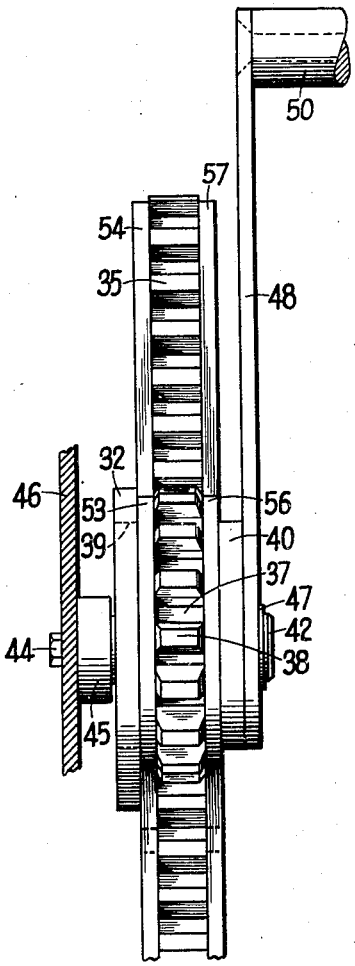
Figure 5 is a front view of the structure shown in Figure 4.

Before explaining in detail the present invention, it is to be understood that the invention is not limited in its application to the details of construction and arrangement of parts illustrated in the accompanying drawings since the invention is capable of other embodiments and of being practiced or carried out in various ways. It is to be understood also that the phraseology or terminology employed herein is for the purpose of description and not of limitation.

In Figures 1 and 2, I illustrate a hydraulically actuated steering system to which my invention can be applied. However, it is to be understood that my invention is not limited to this particular type of steering system. As shown in these figures, the turning wheels 1 of a suitable machine, such as a yard crane, are steered by a system including a drag link 2 which has its one end connected to ball stud 3 on the steering arm 4. The steering arm 4 is mounted for movement about the axle king-pin 5 and includes an integral rearwardly extending arm 4a. In Figures 1 and 2, I have illustrated the steering gear on one side of the machine only. However, it is to be understood that an arm similar to arm 4a is provided on the opposite side of the machine, the two arms being connected together by means of the usual tie rod 6. It will be apparent that longitudinal movement of the link 2 will produce turning movement of the two turning wheels, one of which is shown.

The opposite end of the link 2 is provided with a universal connection 7 which connects it to the booster cylinder 8 of the hydraulic system. This cylinder 8 is movable axially and has a piston 9 therein which carries a rod 10 that extends through the opposite end thereof and is connected by a universal connection 11 to an anchoring bracket 12 which is bolted to the main frame 13 of the machine. Thus, the cylinder 8 can be moved relative to the piston 9 and such movement of the cylinder will produce movement of the drag link 2.

Associated with the end of the booster cylinder 8, which is adjacent the universal connection 7 to link 2, is a control valve 14. This control valve is of a well known type and is mounted on the end of the cylinder 8 so that the housing of the valve will move therewith. As shown best in Figure 3, the housing of the valve 14 is provided with a guide channel 18 formed at one side thereof in which a bar 19 is disposed, the bar being of less height than the height of channel 18 and being disposed parallel to the axis of valve 14 and cylinder 8. The guide bar 19 is bolted to the lower ends of depending bracket arms 20 which have their upper ends bolted to the frame 13. The bar 19 is of sufficient length to permit the required axial movement of the cylinder 8 but will prevent lateral movement thereof. A pair of hydraulic lines 21, which may be connected to a suitable hydraulic pump, are connected to the valve 14 and serve as pressure or return lines to deliver fluid to and return fluid from the valve. As the core 14a of the valve is moved axially, fluid is delivered through the line 22 or 23 to the proper end of the cylinder 8. It will be apparent that line 22 connects one end of valve 14 to the adjacent end of the cylinder 8 and that the line 23 connects the opposite ends of valve 14 and cylinder 8 to each other. This valve and associated booster cylinder are of the usual type and further description thereof is not believed to be necessary.

The core 14a of the valve is connected by a suitable pivotal connection 24 to the lower end of a bell crank lever 25. This bell crank lever 25 is pivoted, as at 25a, to the frame 13. It will be apparent that swinging of bell crank lever 25 about the pivot point 25a will produce the desired movement of the core 14a of the valve. Moving this core to a different position will cause movement of the booster cylinder 8 relative to the piston 9 in the usual manner and such axial movement of cylinder 8 will produce longitudinal movement of link 2 and thereby produce turning movement of the wheels 1. The brackets 20 each carry inwardly extending adjustable stops 20a which are so disposed that they will contact the lower arm of the bell crank lever 25 to limit swinging movement thereof. Consequently, movement of the valve core 14a will be limited.

Figure 6:
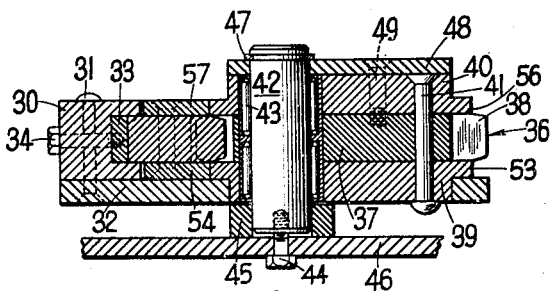
Figure 6 is a sectional view taken substantially along line 6—6 of Figure 4.

My novel rack and gear control unit 26 is associated with the bell crank lever 25 for producing swinging movement thereof. To connect the bell crank lever 25 to the gear and rack unit 26, I provide a link 27 which is adjustable as to length. It will be noted that the lever 25, unit 26 and link 27 all lie substantially in the same vertical plane. The unit 26 may be provided at a suitable point on the machine, the lower end of the link 27 being pivotally connected, as at 28, to the lever 25 and the upper end thereof being rigidly secured to the lower end of the rack bar 29. The upper end of the rack bar 29 is, as shown best in Figures 4 and 6, slidably mounted in a guide member 30 which is secured by rivets 31 to a supporting bracket 32. The member 30 is elongated and is of channel form so that the rack bar will slidably fit therein but will be precluded from moving laterally. The bottom of the guide channel is formed by a removable wearing strip 33 which is bolted in place by bolts 34.

The bracket 32 extends laterally from the guide 30 beyond the opposite side of the rack bar which carries the teeth 35. This bracket rotatably receives the pinion assembly 36. The pinion assembly 36 includes a pinion 37 which is provided with suitable teeth 38 that always mesh with the teeth 35 of the rack bar 29. The pinion assembly includes bearing discs 39 and 40 on opposite faces thereof which are secured to the pinion 37 by rivets 41. The pinion assembly 36 is rotatably carried by a pivot pin 42 which is disposed eccentric thereto, a roller bearing 43 being associated with the pin 42 to permit free rotation of the assembly on the pin. The pin 42 is rigidly anchored by means of a cooperating bolt 44 and collar or spacer 45 to a fixed support 46 carried by the machine. The assembly 36 is maintained in position on the pin 42 by a retaining ring 47 mounted on the free end thereof. The assembly 36 has a control lever 48 bolted to this side thereof by means of the bolts 49. It will be noted that the pin 42 extends through this lever. This lever 48 extends radially from the pinion assembly and may be provided with a handle 50 by means of which it can be swung about the pivot 42. It will be noted that lever 48 when in neutral or central position is disposed upright, as shown best in Figure 1.

The bearing disc 39 is provided with a reduced cylindrical bearing portion 51 on its outer side which fits rotatably within an opening 52 in the bracket 32. It is also provided with an inner flange 53 which engages the inner edge of a bearing strip or track 54 which is bolted by means of rivets 55 to the associated side of the rack bar 29. Similarly, the bearing disc 40 is provided with a flange 56 which contacts a bearing strip or track 57 on the opposite side of rack bar 29 which is secured thereto by means of the rivets 55.

It will be noted that the entire pinion assembly 36 will rotate on the pin 42 which is eccentric thereto. During this rotation, the bearing portion 51 on disc 39 will rotate in the bracket 32. Thus, the pinion 37 will always be held in meshing engagement with the rack bar 29. The flanges 53 and 56 of discs 39 and 40 are of a diameter corresponding to the pitch diameter of the pinion 37. The bearing tracks 54 and 57 have their inner edges along a line corresponding to the pitch line of the rack bar 29. Thus, proper meshing relation between the pinion 37 and the rack bar 29 will be maintained at all times by rolling contact of flanges 53 and 56 and tracks 54 and 57.

The pinion assembly 36 is so arranged relative to the rack bar 29 that when the lever 48 is in the central or upright position shown by the full lines in Figure 4 and by the sectioned lines in Figure 1a, the eccentric pivot 42 is at its closest approach to the rack bar. Thus, the moment arm of the pinion extending from the center of the pivot to the point of engagement of the pinion teeth with the rack bar teeth is very short and is indicated in Figure 1a as being the distance A. Consequently, there is a high ratio between such moment arm and the moment arm of the control lever 48 which extends from the center of the pivot to the outer end of the control lever. However, as the control lever 48 is swung in either direction away from central position, the pinion moment arm increases relative to the lever moment arm. For example, if the lever 48 is swung as indicated in Figure 1a, in a clockwise direction through the arc indicated by dotted line B, the pivot moment arm will increase to the length indicated by the line C. Thus, at the extent of movement of the control lever in either direction, the ratio between the moment arm of the pinion and that of the lever is comparatively low. The result of this arrangement is that in the initial movement of the control lever 48 away from central position and in the resulting initial rotation of the pinion assembly 36, limited longitudinal movement of the rack bar 29 occurs. However, continued rotation of the pinion assembly results in increased movement of the rack bar compared to the rotative movement of the pinion until near the extent of movement of the control lever maximum longitudinal movement of the rack bar is obtained by the continued rotation of the pinion.

It will be apparent that since the pivot pin 42 is in a fixed position, rotation of the pinion assembly 36 thereabout will not only produce longitudinal movement of the rack bar 29 but will also swing the upper end of the rack bar relative to the pivot pin. This movement will be permitted because the lower end of the rack bar is pivoted to the bell crank lever 25. The bracket 32 will move with the rack bar to the necessary extent because the bearing disc 39 has the same degree of eccentricity relative to pin 42 as the pinion 37 and this will vary the distance between the pin 42 and the rack bar 29 in accordance with the change in the effective lever arm of pinion 37. Thus, the pinion 37 and the rack bar 29 will always be in proper meshing relation without binding. Longitudinal movement of the rack bar will produce the desired swinging movement of the bell crank 25 and the proper movement of the valve core 14a.

In the initial movement of a hand control lever 48 away from central position, only a slight movement of the valve core 14a will result. In the continued movement of the hand control lever, greater movement of the control valve relative to that of the lever will result until near the end of the movement of the control lever maximum movement of the valve will be produced. It will be understood that by setting the control valve to different positions, the cylinder 8 will be moved to different positions resulting in turning of the wheels 1. Because initial movement of the control lever produces limited relative movement of the valve, this control is particularly suitable for use in steering such machines as yard cranes, et cetera, where the control valve must be moved slightly to the right and left frequently to keep the machine on a straight course as it travels along at high speed.

When my rack and gear control unit is associated with a hydraulic steering system of the type indicated, there is initially a high ratio of movement of the hand lever 48 relative to the movement of the turning wheels 1 but the ratio decreases as the hand lever moves away from neutral. If the hydraulic system fails for any reason, limited control of the steering system can be accomplished by actuating the bell crank lever 25 with the control unit 26. Under such conditions the lever 25 will swing about pivot 25a in either direction and no movement of the wheels 1 will occur until the valve core 14a reaches the extent of its movement when the entire cylinder 8 will be moved directly by the lever 25. Thus, after lever 25 swings to a certain point there will be a strictly mechanical connection between the control 26 and the link 2. The position of the hand control lever 48 will indicate immediately to the operator the position of the turning wheels 1 being upright when the turning wheels are directed straight ahead. The unit 26 and associated parts of the control will occupy a minimum of space, since all of such parts are in substantially the same vertical plane. This unit is of very simple and inexpensive structure and is composed of a minimum number of parts which are very rugged.

Many of my advantages of my control unit have been described above. Others will be apparent from the drawings and the following claims.

Having thus described my invention, what I claim is:

1. A rack and gear unit comprising a supporting bracket, a rack guide carried by said bracket, a rack bar mounted on said guide for longitudinal movement, a fixed pivot, a gear carried eccentrically by said pivot and meshing with said rack, said rack bar being mounted for bodily movement with said bracket in the plane of said eccentric gear towards and away from said pivot, said gear having a bearing portion in fixed relationship thereto which is rotatably mounted in said bracket and is also eccentric to said pivot in the same relationship as said eccentric gear so as to move said bracket and rack bar towards and away from said pivot in accordance with rotation of said eccentric gear, and a lever secured to said gear for rotating said gear and for moving said rack bar longitudinally of said guide.

2. A unit according to claim 1 wherein said rack bar and said gear are provided with associated bearing portions which engage each other to limit the extent of meshing engagement of said gear and said rack bar, the bearing portion associated with said eccentric gear being of the same diameter as the pitch diameter of the gear and lying along the pitch line of such gear and the bearing portion associated with said rack bar being in the same plane as the pitch line of the rack bar.

3. A rack and gear unit comprising a supporting bracket, an elongated rack guide carried on one end of said bracket and having a channel for slidably receiving the rack bar, a straight rack bar mounted in said guide with its teeth outermost, a fixed pivot, a gear carried eccentrically by said pivot and meshing with said rack which is disposed between said gear and said guide, said rack bar being mounted for bodily movement with said bracket in the plane of said eccentric gear towards and away from said pivot, said gear having a cylindrical bearing portion in fixed relationship thereto which is rotatably mounted in a circular opening in said bracket and is also eccentric to said pivot in the same relationship as said eccentric gear so as to move said bracket and rack bar towards and away from said pivot in accordance with rotation of said eccentric gear, and a lever secured to said gear and extending outwardly therefrom for rotating said gear and for sliding said rack bar in said guide.

4. A rack and gear unit according to claim 3 wherein said rack bar is provided with longitudinally extending tracks on the sides thereof and said gear is provided with circular bearings at each side thereof which engage said tracks and limit the extent of mesh of said gear and said rack, said circular bearings being of the same diameter as the pitch diameter of the gear and lying along the pitch line of such gear and the surfaces of said racks with which said circular bearings engage being in the same plane as the pitch line of the rack.

5. A rack and gear unit according to claim 3 wherein the bottom of the channel in said rack guide is formed by a removable wearing strip.

6. A rack and gear unit according to claim 3 wherein said bearing portion of the gear is concentric therewith.

7. A rack and gear unit comprising a supporting bracket, an elongated rack guide carried on one end of said bracket and having a channel for slidably receiving the rack bar, a straight rack bar mounted in said guide with its teeth outermost, a pivot pin anchored to a support, a gear carried eccentrically by said pivot pin and meshing with said rack which is disposed between said gear and said guide, said rack bar being pivoted by a floating pivot adjacent one of its ends for swinging movement towards and away from said pivot pin, said gear having a cylindrical bearing portion in fixed relationship thereto and concentric therewith but which is eccentric to said pivot pin in the same relationship as said gear, said bearing portion being mounted in a circular opening formed in said bracket so that upon rotation thereof said bar is swung towards and away from said pivot in accordance with rotation of said eccentric gear, said cylindrical bearing portion being provided with a bearing flange which engages a track strip secured to the adjacent side of the rack bar, a bearing member secured to the opposite side of said gear and having a bearing flange engaging a track strip at the opposite side of said rack bar, said bearing flanges having a diameter equal to the pitch diameter of the gear and lying along the pitch line of such gear and said strips having their associated edges on the pitch line of the rack in order to maintain at all times the proper meshing relationship of the gear and rack, and a lever secured to said gear and extending outwardly therefrom by means of which it may be rotated to slide said rack bar in said guide.

8. A unit according to claim 7 wherein the bottom of the rack guide is formed by a removable wearing strip.

9. A control unit comprising a supporting bracket, a control member to be moved bodily carried by said bracket, a fixed pivot, a rotatable actuating member engaging said control member, said control member being mounted for movement in the plane of said rotatable member towards and away from such member, said rotatable member having a bearing portion in fixed relationship thereto which is rotatably mounted in said bracket and is also eccentric to said pivot in the same relationship as said rotatable member so as to move said bracket and control member towards and away from said pivot in accordance with rotation of said rotatable member, and means for rotating said rotatable member to thereby move said control member.

WILLIAM G. VAN VOORHIS.

REFERENCES CITED

The following references are of record in the file of this patent:

UNITED STATES PATENTS

| Number | Name | Date |
| --- | --- | --- |
| 409,961 | Goodenough | Aug. 27, 1889 |
| 428,249 | Harfield | May 20, 1890 |
| 674,213 | Oldfield | May 14, 1901 |
| 719,562 | Brush | Feb. 3, 1903 |
| 831,175 | Meyers | Sept. 18, 1906 |
| 857,494 | Slater | June 18, 1907 |
| 872,797 | Chambers | Dec. 3, 1907 |
| 1,609,459 | Burnham | Dec. 7, 1926 |

FOREIGN PATENTS

| Number | Country | Date |
| --- | --- | --- |
| 145,795 | Austria | Jan. 15, 1936 |